United States Patent [19]

Ricards

[11] 4,117,300
[45] Sep. 26, 1978

[54] REDUNDANT WELDING METHOD FOR METAL BATTERY CONTAINERS

[75] Inventor: Charles R. Ricards, Emporium, Pa.

[73] Assignee: GTE Sylvania Incorporated, Stamford, Conn.

[21] Appl. No.: 784,789

[22] Filed: Apr. 5, 1977

[51] Int. Cl.² .............................................. B23K 27/00
[52] U.S. Cl. ........................... 219/121 LM; 29/623.1; 429/72; 429/171; 220/DIG. 29
[58] Field of Search .............. 219/121 L, 121 LM, 86, 219/87, 80, 119, 120, 64, 79; 29/623.1, 623.2, 730, 763; 228/58, 60, 901; 429/173, 171, 72, 57, 184, 163; 220/DIG. 29, 81 R; 53/285

[56] References Cited

U.S. PATENT DOCUMENTS

| | | | |
|---|---|---|---|
| 3,380,857 | 4/1968 | Bilhorn | 429/173 |
| 3,415,977 | 12/1968 | Bush | 228/60 |
| 3,427,205 | 2/1969 | Plitt et al. | 429/184 |
| 3,431,787 | 4/1969 | Chyle | 219/60 R X |
| 3,689,731 | 9/1972 | Miller | 219/119 |
| 3,823,468 | 7/1974 | Hascoe | 219/87 |
| 3,846,612 | 11/1974 | Augsburger | 219/121 LM |
| 3,881,083 | 4/1975 | Bromley | 219/119 X |
| 3,982,958 | 9/1976 | Newman | 429/57 |
| 3,996,066 | 12/1976 | Mead et al. | 29/623.2 |

FOREIGN PATENT DOCUMENTS 696,591 1931 France ............................ 220/DIG. 29

Primary Examiner—C. L. Albritton
Assistant Examiner—M. Paschall
Attorney, Agent, or Firm—William H. McNeill

[57] ABSTRACT

Hermetic sealing of battery containers is accomplished in such containers comprising metal bodies provided with flanges by first mating the bodies so the flanges are coextensive, planar resistance welding the bodies together through the flanges and subsequently peripherally laser welding the edges of the flanges together to effect a redundant weld and an hermetic seal.

4 Claims, 10 Drawing Figures

REDUNDANT WELDING METHOD FOR METAL BATTERY CONTAINERS

BACKGROUND OF THE INVENTION

This invention relates to the formation of hermetic seals and more particularly to a method for achieving hermetic seals between two metallic portions of a battery container by employing redundant welds.

Newer forms of batteries, both primary and secondary, develop high voltages and high energy densities by employment of very reactive materials such as lithium. Some even employ reactive cathode electrolytes such as thionyl chloride. Packaging for such materials must have a high degree of reliability since the materials are dangerous and even toxic under many conditions. Accordingly, hermeticity requirements have led to the use of metal cans for such batteries, the cans being welded together. However, when such batteries employ reactive and volatile ingredients like thionyl chloride, simple welding is found to be ineffective. The high pervasiveness of thionyl chloride allows it to leak through even microscopic weld inadequecies.

OBJECTS AND SUMMARY OF THE INVENTION

Accordingly, it is an object of this invention to obviate the disadvantages of the prior art.

It is another object of this invention to enhance the sealing of batteries.

It is yet another object of this invention to provide increased hermeticity in a novel welding system.

It is still another object of this invention to provide an hermetic seal for containers which contain thionyl chloride.

These objects are accomplished in one aspect of the invention by the provision of a welding method for bodies which have flanges extending in a direction transverse to a longitudinal axis. The flanges are mated together to be coextensive and a first planar resistance weld is made therethrough. Subsequently, the edges of the flanges are peripherally laser welded together forming a redundant weld and hermetic seal with a high degree of reliability.

DESCRIPTION OF THE PREFERRED EMBODIMENTS

For a better understanding of the present invention together with other and further objects, advantages and capabilities thereof, reference is made to the following drawings and appended claims taken in conjunction with the above-described drawings.

Figure 1:
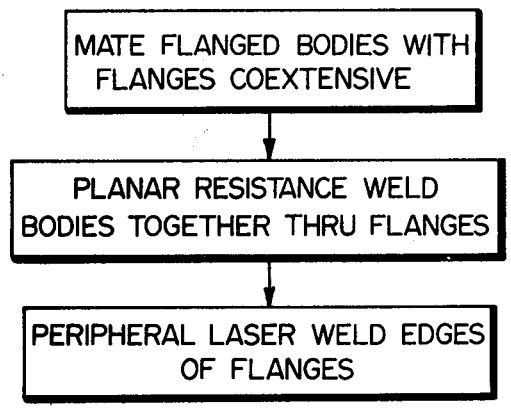
FIG. 1 is a flow diagram illustrating one embodiment of the invention.
Figure 2:
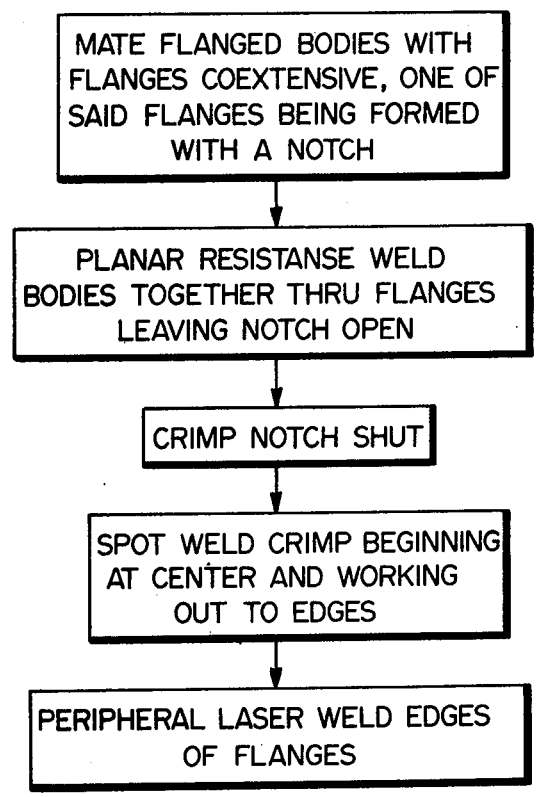
FIG. 2 is a flow diagram illustrating another embodiment of the invention.

Referring now to the drawings with greater particularity, there is shown in FIG. 1 a flow diagram of one embodiment of the invention and in FIG. 2 a flow diagram of a second embodiment of the invention. These flow diagrams are more easily understood with reference to the article being worked upon; therefore, these articles will first be described.

Figure 3:
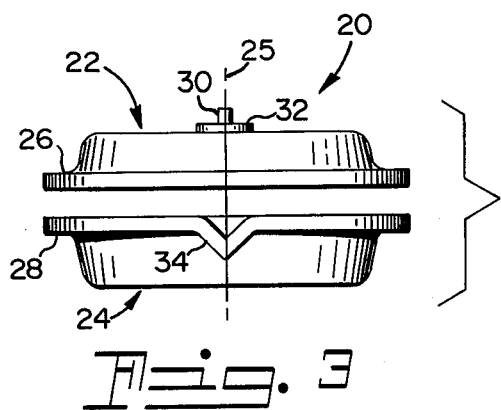
FIG. 3 is an exploded, elevational view of one type of battery case which can be sealed by the method of the invention.

In FIG. 3 there is shown an article which can be an electrochemical cell container 20. The container 20 is comprised of an upper metal body 22 and a lower metal body 24 each having a longitudinal axis 25 and a flange 26 and 28 respectively, extending in a direction transverse to the longitudinal axis. One of the metal bodies, e.g., 22 can have a terminal pin 30 insulatingly sealed therein as by a glass seal 32. Also, as is apparent from FIG. 3, one of the flanges, e.g., 28 can be provided with a depending notch 34 which provides communication with the interior of the container.

As noted above, the methods to be described herein have applicability to a wide range of bodies to be sealed; however, they are particularly applicable to hermetically sealed electrochemical cells employing volatile, pervasive electrolytes.

Figure 4:
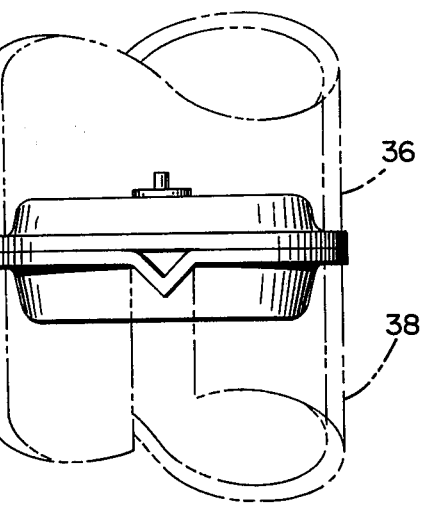
FIG. 4 is an elevational view of a step in the method with some parts shown in phantom lines.
Figure 5:
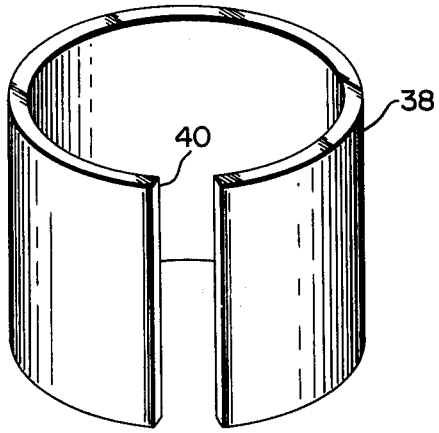
FIG. 5 is a perspective view of a welding electrode which can be employed in one embodiment.

To provide the sealed container 20, the upper body 22 and lower body 24 are brought together with the flanges 26 and 28 co-extensive as is shown in FIG. 4. Resistance welding electrodes 36 and 38 are then brought into contact with the flanges and a suitable welding current applied therebetween to effect a planar resistance weld through the flanges. The electrodes 36 and 38 are tubular and of a diameter such that only the flanges are contacted. When one of the metal bodies, e.g., 24, is provided with a depending filling notch 34, then the corresponding welding electrode, in this case 38, is provided with a slot 40 or cut-out portion so that no electrical contact is made therewith. The perspective view of FIG. 5 illustrates such an electrode.

Figure 6:
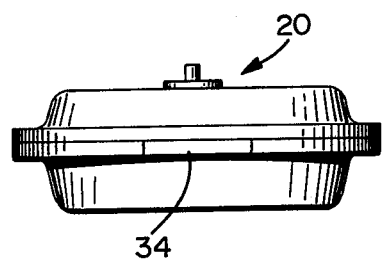
FIG. 6 is an elevational view of a container following a further step in the method.
Figure 7:
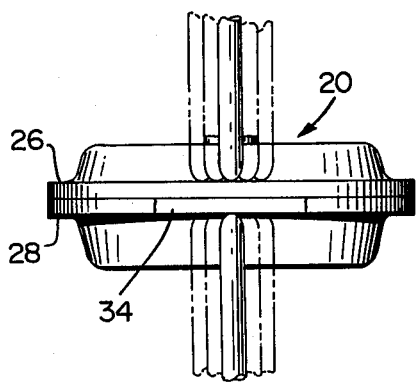
FIG. 7 is a diagrammatic elevational view of the sequence of spot welding.
Figure 8:
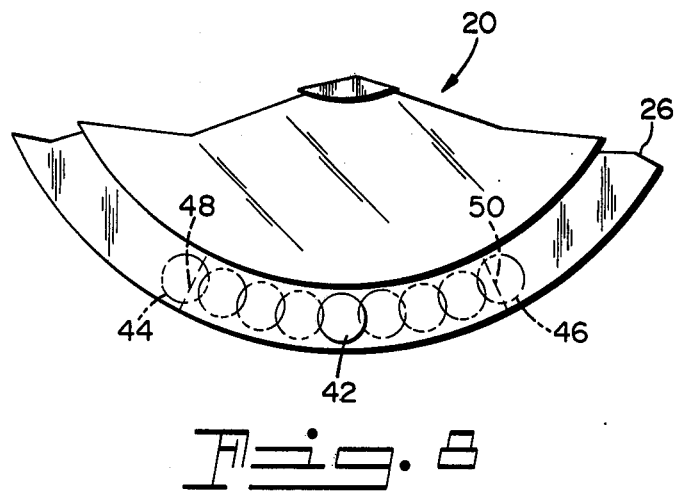
FIG. 8 is a diagrammatic plan view of the spot welding sequence.

After the initial planar resistance weld is made the container 20 is filled with electrolyte by any suitable means and the filling notch 34 is mechanically crimped shut as shown in FIG. 6. Since no known form of mechanical crimping is sufficient to maintain a pervasive electrolyte like thionyl chloride within the container, it is necessary that crimped notch 34 be welded. This is accomplished by the spot welding technique shown in FIGS. 7 and 8. The spot welding begins at the center of the crimped area and then progresses outwardly, alternating sides, to the previously welded area. It is necessary that each spot weld overlap its previously made adjacent weld. Proceeding in this fashion squeezes any electrolyte trapped in the crimped area progressively outwardly until the last weld is made; this last weld volatizing the electrolyte and forcing it out of the seal area. In FIG. 8 the first centrally located spot weld is indicated at 42, the remaining welds being shown in phantom lines. The final welds 44 and 46 overlap the previously formed planar weld which extended to lines 48 and 50.

Figure 9:
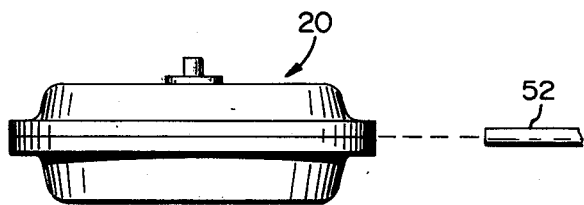
FIG. 9 is a diagrammatic elevational view of the laser edge welding.
Figure 10:
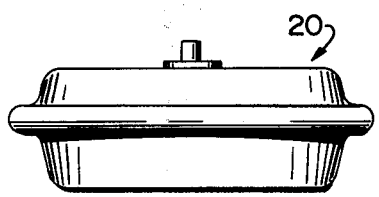
FIG. 10 is an elevational view of a finished container.

After the spot welding of the crimped notch 34 is completed the edges of flanges 26 and 28 are peripherally laser welded as by a laser 52, shown diagrammatically in FIG. 9. The depth of the laser weld should preferably be between 0.003 inch and 0.010 inch to insure a hermetic seal. In addition to providing the redundant weld the laser operation rounds the edges of the flanges 26 and 28 to present the appearance shown in FIG. 10.

The above sequence of operation is illustrated in the flow diagram of FIG. 2.

The flow diagram of FIG. 1 illustrates a sequence of operation wherein a filling notch is not employed. For example, the filling and sealing technique shown in U.S. Pat. Nos. 3,426,170 and 3,489,266, can be used, in which case the crimping and spot welding are not needed.

It will be seen from the above that there is herein provided a new and novel method of achieving hermeticity in metal battery containers. The redundant welds, formed on two different surfaces, provides leak protection from even pervasive electrolytes such as thionyl chloride, allowing this material to be used in high energy density electrochemical cells.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. In a method of providing an hermetic seal between metal bodies each having a longitudinal axis and a flange transversely extending from said longitudinal axis the steps comprising: mating said flanged bodies with said flanges coextensive; planar resistance welding said bodies together through said flanges; and subsequently peripherally laser welding the edges of said flanges together to effect a separate, non-overlapping redundant weld and said hermetic seal.

2. The method of claim 1 wherein said bodies and said flanges are cylindrical and the welding electrodes employed in said resistance welding are tubular.

3. The method of claim 2 wherein the inside dimension of at least one of said electrodes is sufficiently large to accommodate a protrusion formed on one of said bodies.

4. In a method of providing an hermetic seal between metal bodies each having a longitudinal axis and a flange extending in a direction transverse to said longitudinal axis, one of said flanges being provided with a depending notch, the steps comprising: mating said flanged bodies with said flanges coextensive;planar resistance welding aid bodies together through said flanges in substantially all areas except that including said depending notch, crimping said notch shut; spot welding said crimp by beginning at the center thereof an progressively working outwardly to the ends of said crimp, each of said spot welds overlapping its neighbor; and subsequently peripherally laser welding the edges of said flanges to effect a redundant weld separate and distinct from said planar resistance weld.

* * * * *